Patented May 26, 1942

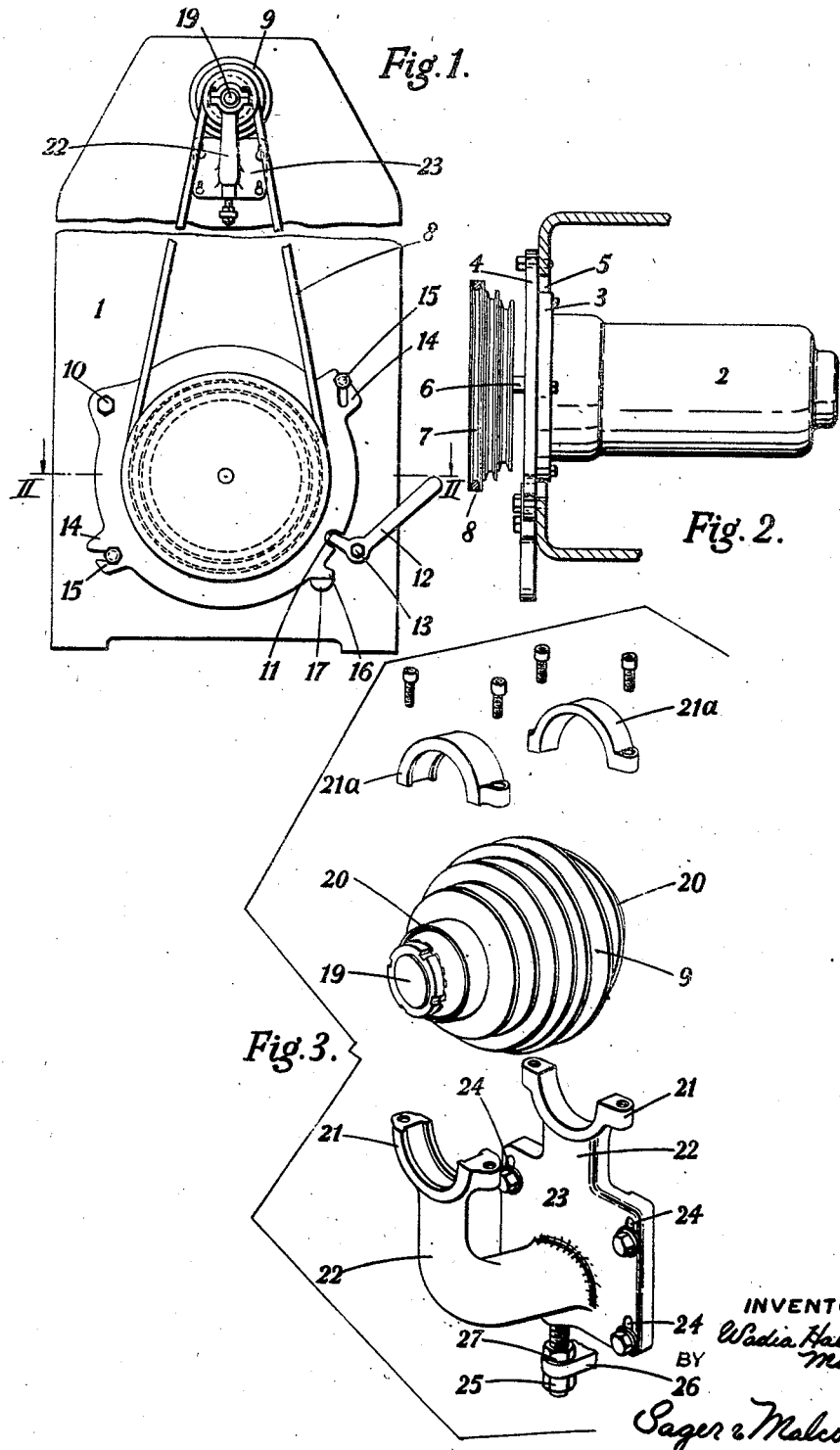

2,284,441

UNITED STATES PATENT OFFICE 2,284,441

CHANGE SPEED TRANSMISSION GEAR

Wadia Halim Murad, Watford, England

Application July 1, 1941, Serial No. 400,594
In Great Britain February 21, 1940

4 Claims. (Cl. 74—217)

This invention relates to change speed gears of the kind having stepped grooved pulleys on the driving and driven shafts and a rope or belt to be shifted into alternative grooves for the purpose of changing the transmission ratio, and it has for its object to facilitate and expedite the changing over from one speed to another. Although the invention is of general application it is intended more particularly for use in connection with lathes and other machine tools having an independent power unit such as an electric motor housed within the framework of the machine, from which the drive is to be taken with variable transmission ratio to a driven spindle.

The invention consists in change speed gear of the kind specified, wherein the driving shaft and pulley are movably mounted so as to enable the centre-to-centre distance between the driving pulley and driven pulley to be decreased when required to facilitate shifting the flexible transmission member from one groove to another of said pulleys.

To this end according to a further feature of the invention, the driving shaft and its pulley are mounted in a holding member pivoted at a point to one side of the plane containing the axes of the driving and driven pulleys and associated with manually operable means for moving it about said pivot point and for locking it in any position of adjustment.

The holding member may take the form of a closure plate pivoted over its edge on a framework and provided diametrically opposite the pivot with a peripheral notch engaged by a cam lever fulcrumed on the framework, the plate being further provided with slots engaged by locking bolts screwed into said framework. The holding member may conveniently carry the entire power unit.

In operation, the locking bolts are slackened and the cam lever operated so as to swing the holding member about its pivot, thereby reducing the centre-to-centre spacing of the pulleys to enable the bolt or rope to be changed over from one pair of grooves to another, after which the cam lever is moved back into its original position and the locking bolts tightened up.

When the driven shaft is a countershaft from which a final drive is taken to a driven spindle, the invention further comprises the provision of means enabling the countershaft and its pulley to be readily removed bodily and replaced by a similar unit having grooves of different diameter, for the purpose of changing the range of speeds obtainable with the gear.

For this purpose, according to the invention the countershaft unit is supported in divided bearing brackets the upper parts of which are detachable for the purpose of removing the unit.

The invention thus provides an extremely simple and rapidly operable arrangement for effecting the changeover from one speed to another or from one range of speeds to another and also for adjusting the tension of the bolt or rope in change speed gears of the kind to which the invention relates.

An embodiment of the invention taken by way of example, is shown in the accompanying drawing, wherein—

Figure 1 is an end elevation of the driving end of a gear according to the invention, in more or less diagrammatic form.

Figure 2 is a section on line II—II of Figure 1.

Figure 3 is a perspective view of a countershaft assembly comprising the driven end of the gear.

Referring to Figures 1 and 2, I denotes a supporting structure which in the present instance is part of the framework of a machine and houses a power unit comprising an electromotor 2. The motor housing is provided at the pulley end with a flange 3 with which the power unit is attached to a substantially circular plate 4 which is pivotally mounted against the side of the machine housing I over an aperture 5 in the latter of larger diameter than the flange 3. The driving shaft of the power unit is denoted by 6 and passes through the plate 4 and carries at its outer end a multi-groove driving pulley 7, from which the drive is taken by means of a belt 8 to a driven pulley 9 (Figure 3).

As shown more particularly in Figure 1, the carrying plate 4 is pivoted at a point 10 outside its periphery and slightly above the mid plane of the plate which is normal to the plane containing the axes of the driving and driven pulleys. In this way maximum movement of plate 4 towards and away from the driven pulley is obtained for a given pivotal movement of the plate.

Diametrically opposite the pivot lug, the plate 4 is provided with a peripheral notch II which engages the nose of a cam lever 12 fulcrumed at 13 on the housing I. The plate 4 is further provided with slotted peripheral lugs 14, 14 engaged by locking bolts 15 screwed into the housing I, whereby the plate 4 may be locked in any desired position of adjustment.

Alternatively, or as an additional precaution against damage to the belt 8, conventional stop means represented by a lug 16 on the plate 4 and abutment 17 on the housing I may be provided to limit the range of movement of plate 4 away from the driven pulley 9.

After slackening of the locking bolts 15, the entire unit comprising motor and pulley mounted on the plate 4 may be lifted by depressing the cam lever 12, thereby shortening the centre-to-centre distance between the pulleys 7 and 9. After changing over the belt 8, the unit is lowered to the extent necessary to tension the belt correctly and is then locked in position by tightening of the bolts 15. The invention thus enables the changing over from one speed to another with multi-speed gears of the kind specified to be effected very rapidly and easily and without the risk of subjecting the flexible transmission member to undue wear or strain.

When the driven pulley is mounted on a countershaft from which the final drive is taken, the invention, as already mentioned, provides for linear adjustment of this pulley also, and for replacement of this pulley by another pulley giving a different range of speeds for the final drive. An arrangement embodying these features is shown in Figure 3.

Referring to this figure, the driven pulley 9 is fast on a short countershaft 19 supported by sealed ball bearings 20, 20 in two divided eyes 21, 21 of bearing brackets 22, 22 formed integrally with a face plate 23 adapted to be bolted to the main supporting structure 1. The countershaft and pulley thus constitute a unit which is bodily removable, after detachment on the outer halves 21a, 21a of the eyes 21, 21, and is replaceable by another unit of similar axial dimensions and having similar bearings 20, 20.

In the present instance, the face plate 23 is linearly adjustable, so as to provide for rapid changing of the belt of the final drive in a manner comparable to that adopted in the case of the driving pulley 7. To this end, the holding up bolts pass through slots 24 in the face plate disposed parallel to the plane containing the pulley axes, and adjustment is effected with the aid of a thrust bolt 25 threaded in a bracket 26 on the housing 1, and bearing against the inner end face of the plate 23. A clamping nut 27 serves to lock the bolt 25 in any position of adjustment.

It will be understood that the constructional details may be modified without departing from the scope of the invention. In particular, the manner in which the pulley or pulleys are supported so as to allow of the required movement is a matter of mechanical expediency and may be variously modified, as may also the mode of attaching a power unit to a movable holding member for the driving pulley.

What I claim and desire to secure by Letters Patent is:

1. A change speed transmission device comprising a frame, a driven pulley carried thereby, a motor unit having a shaft, a driving pulley mounted on said shaft, a flexible transmission member interconnecting said pulleys, a substantially circular plate carrying said motor unit and driving pulley, said plate being pivoted to said frame at a point to one side of the plane containing the axes of said driving and driven pulleys and having a peripheral notch diametrically opposite said pivot, a cam lever fulcrumed on said frame and engaging in said notch for moving said plate about its pivot to facilitate shifting said transmission member on said pulleys, said plate having peripheral slots, and locking bolts on said frame engageable with said slots to lock said plate in position.

2. A change speed transmission device comprising, in combination, a frame having an opening therein, a plate, a first pulley mounted on said plate to turn about a first axis perpendicular thereto, means pivoting said plate on said frame in a position overlapping said opening to turn about a second axis parallel to said first axis, means to lock said plate in position on said frame, a second pulley mounted on said frame to turn about a third axis parallel to said first two axes, and a flexible transmission member connecting said pulleys.

3. In a device as claimed in claim 2, a lever fulcrumed on said frame and having means engaging said plate for moving the same about its pivot.

4. In a device as claimed in claim 2, a motor carried by said plate on the other side from said first pulley driving said pulley.

WADIA HALIM MURAD.